(12) United States Patent
Khan (10) Patent No.: US 10,505,602 B1
(45) Date of Patent: Dec. 10, 2019

(54) METHODS AND SYSTEMS FOR SPECTRUM AGGREGATION IN WIRELESS COMMUNICATION

(71) Applicant: Phazr, Inc., Allen, TX (US)

(72) Inventor: Farooq Khan, Allen, TX (US)

(73) Assignee: Phazr, Inc., Allen, TX (US)

( * ) Notice: Subject to any disclaimer, the term of this patent is extended or adjusted under 35 U.S.C. 154(b) by 0 days.

(21) Appl. No.: 16/025,997

(22) Filed: Jul. 2, 2018

(51) Int. Cl.
*H04B 7/0456* (2017.01)
*H04B 7/06* (2006.01)

(52) U.S. Cl.
CPC ......... *H04B 7/0473* (2013.01); *H04B 7/0617* (2013.01)

(58) Field of Classification Search
CPC ..... H04L 1/0625; H04L 27/36; H04B 7/0473; H04B 7/0617
See application file for complete search history.

(56) References Cited

U.S. PATENT DOCUMENTS

| | | | | |
|---|---|---|---|---|
| 2017/0346182 | A1* | 11/2017 | Martikkala | H01Q 3/40 |
| 2018/0324786 | A1* | 11/2018 | Hooli | H04W 72/0413 |
| 2019/0141647 | A1* | 5/2019 | Nimbalker | H04L 5/001 |
| 2019/0174346 | A1* | 6/2019 | Murray | H04B 7/0408 |
| 2019/0174525 | A1* | 6/2019 | Kwak | H04L 27/2646 |
| 2019/0222279 | A1* | 7/2019 | Xi | H04B 7/024 |

* cited by examiner

*Primary Examiner* — Sophia Vlahos
(74) *Attorney, Agent, or Firm* — Michael A. Rahman (57) ABSTRACT

A method for wireless communication includes multiplexing transmit data into at least a first component carrier data and a second component carrier data. The method further includes digitally pre-coding at least the first and second component carrier data for digital beamforming. The method also includes converting, by digital to analog conversion, the digitally pre-coded first and second component carrier data to first and second analog signals. The method also includes processing the second analog signals to generate analog beamformed millimeter wave band signals and transmitting the millimeter wave band signals. The method also includes processing the first analog signals to generate sub-7 GHz band signals and transmitting the sub-7 GHz band signals, wherein the sub-7 GHz band signals are transmitted with digital beamforming and without analog beamforming, and wherein the millimeter wave band signals are transmitted with both digital and analog beamforming.

28 Claims, 8 Drawing Sheets

METHODS AND SYSTEMS FOR SPECTRUM AGGREGATION IN WIRELESS COMMUNICATION

BACKGROUND

Aspects of the present disclosure relate generally to wireless communication, and more particularly to methods and systems for spectrum aggregation in wireless communication.

DESCRIPTION OF THE RELATED ART

Wireless communication networks are widely deployed to provide various communication services such as voice, video, messaging, packet data, unicast, multicast, broadcast, and the like. Currently, wireless networks are typically operated using one of two popular standards: a wide area network (WAN) standard referred to as The Fourth Generation Long Term Evolution (4G LTE) system; and a local area network (LAN) standard called Wi-Fi. Wi-Fi is generally used indoors as a short-range wireless extension of wired broadband systems, whereas the 4G LTE systems provide wide area long-range connectivity both outdoors and indoors using dedicated infrastructure such as cell towers and backhaul to connect to the Internet.

As more people connect to the Internet, increasingly chat with friends and family, watch and upload videos, listen to streamed music, and indulge in virtual or augmented reality, data traffic continues to grow exponentially. In order to address the continuously growing wireless capacity challenge, the next generation of LAN and WAN systems are relying on higher frequencies referred to as millimeter waves in addition to currently used frequency bands below 7 GHz. The next generation of wireless WAN standard referred to as 5G New Radio (NR) is under development in the Third Generation Partnership Project (3GPP). The 3GPP NR standard supports both sub-7 GHz frequencies as well as millimeter wave bands above 24 GHz. In 3GPP standard, frequency range 1 (FR1) covers frequencies in the 0.4 GHz-6 GHz range. Frequency range 2 (FR2) covers frequencies in the 24.25 GHz-52.6 GHz range. Table 1 provides examples of millimeter wave bands including FR2 bands that may be used for wireless high data-rate communications. Table 2 separately lists examples of FR2 bands in the 3GPP standard. In the millimeter wave bands above 24 GHz, a time division duplexing (TDD) scheme is generally preferred. However, regulations in most parts of the World allow using other duplexing schemes including frequency division duplexing (FDD).

TABLE 1

Examples of millimeter wave bands

| Bands [GHz] | Frequency [GHz] | Bandwidth [GHz] |
|---|---|---|
| 26 GHz Band | 24.25-27.5 | 3.250 |
| LMDS Band | 27.5-28.35 | 0.850 |
|  | 29.1-29.25 | 0.150 |
|  | 31-31.3 | 0.300 |
| 32 GHz Band | 31.8-33.4 | 1.600 |
| 39 GHz Band | 38.6-40 | 1.400 |
| 37/42 GHz Bands | 37.0-38.6 | 1.600 |
|  | 42.0-42.5 | 0.500 |
| 47 GHz | 47.2-48.2 | 1.000 |
| 60 GHz | 57-64 | 7.000 |
|  | 64-71 | 7.000 |
| 70/80 GHz | 71-76 | 5.000 |
|  | 81-86 | 5.000 |
| 90 GHz | 92-94 | 2.900 |
|  | 94.1-95.0 |  |
| 95 GHz | 95-100 | 5.000 |
| 105 GHz | 102-105 | 7.500 |
|  | 105-109.5 |  |
| 112 GHz | 111.8-114.25 | 2.450 |
| 122 GHz | 122.25-123 | 0.750 |
| 130 GHz | 130-134 | 4.000 |
| 140 GHz | 141-148.5 | 7.500 |
| 150/160 GHz | 151.5-155.5 | 12.50 |
|  | 155.5-158.5 |  |
|  | 158.5-164 |  |

TABLE 2

Examples of FR2 bands in 3GPP

| 5G-NR Frequency Band | Uplink (UL) and Downlink (DL) operating band | Duplex Mode |
|---|---|---|
| n257 | 26500 MHz-29500 MHz | TDD |
| n258 | 24250 MHz-27500 MHz | TDD |
| n260 | 37000 MHz-40000 MHz | TDD |

Table 3 lists examples of FR1 bands in the 3GPP standard. We refer to the FR1 bands in the 3GPP standard, unlicensed 2.4 GHz and 5 GHz bands, 5.925-6.425 GHz and 6.425-7.125 GHz bands and any other spectrum band below 7 GHz as sub-7 GHz spectrum. The duplexing schemes used in the sub-7 GHz spectrum, among others, can be time division duplexing (TDD), frequency division duplexing (FDD), supplemental downlink (SDL) or supplemental uplink (SUL).

TABLE 3

Examples of FR1 bands in 3GPP

| 5G-NR Frequency Band | Uplink Frequency band | Downlink Frequency band | Duplex Mode |
|---|---|---|---|
| n1 | 1920 MHz-980 MHz | 2110 MHz-2170 MHz | FDD |
| n2 | 1850 MHz-1910 MHz | 1930 MHz-1990 MHz | FDD |
| n3 | 1710 MHz-1785 MHz | 1805 MHz-1880 MHz | FDD |
| n5 | 824 MHz-849 MHz | 869 MHz-894 MHz | FDD |
| n7 | 2500 MHz-2570 MHz | 2620 MHz-2690 MHz | FDD |
| n8 | 880 MHz-915 MHz | 925 MHz-960 MHz | FDD |
| n20 | 832 MHz-862 MHz | 791 MHz-821 MHz | FDD |
| n28 | 703 MHz-748 MHz | 758 MHz-803 MHz | FDD |
| n38 | 2570 MHz-2620 MHz | 2570 MHz-2620 MHz | TDD |
| n41 | 2496 MHz-2690 MHz | 2496 MHz-2690 MHz | TDD |
| n50 | 1432 MHz-1517 MHz | 1432 MHz-1517 MHz | TDD |
| n51 | 1427 MHz-1432 MHz | 1427 MHz-1432 MHz | TDD |
| n66 | 1710 MHz-1780 MHz | 2110 MHz-2200 MHz | FDD |
| n70 | 1695 MHz-1710 MHz | 1995 MHz-2020 MHz | FDD |
| n71 | 663 MHz-698 MHz | 617 MHz-652 MHz | FDD |
| n74 | 1427 MHz-1470 MHz | 1475 MHz-1518 MHz | FDD |
| n75 | N/A | 1432 MHz-1517 MHz | SDL |
| n76 | N/A | 1427 MHz-1432 MHz | SDL |
| n77 | 3300 MHz-4200 MHz | 3300 MHz-4200 MHz | TDD |
| n78 | 3300 MHz-3800 MHz | 3300 MHz-3800 MHz | TDD |
| n79 | 4400 MHz-5000 MHz | 4400 MHz-5000 MHz | TDD |
| n80 | 1710 MHz-1785 MHz | N/A | SUL |
| n81 | 880 MHz-915 MHz | N/A | SUL |
| n82 | 832 MHz-862 MHz | N/A | SUL |

TABLE 3-continued

Examples of FR1 bands in 3GPP

| 5G-NR Frequency Band | Uplink Frequency band | Downlink Frequency band | Duplex Mode |
|---|---|---|---|
| n83 | 703 MHz-748 MHz | N/A | SUL |
| n84 | 1920 MHz-1980 MHz | N/A | SUL |

In addition to serving mobile devices, the next generation of wireless WAN systems using millimeter wave and sub-7 GHz spectrum are expected to provide high-speed (Gigabits per second) links to fixed wireless broadband routers installed in homes and commercial buildings.

In 5G New Radio (NR) system, digital beamforming and MIMO processing includes two steps: layer mapping and precoding. A layer is equivalent to a MIMO spatial stream, and the number of layers is equal to the number of MIMO spatial streams. A codeword is a data block that can be mapped to one or more layers. The complex-valued modulation symbols $d^{(q)}(0), \ldots, d^{(q)}(M_{symb}^{(q)}-1)$ for codeword q are mapped onto the layers $x(i)=[x^{(0)}(i) \ldots x^{(v-1)}(i)]^T$, $i=0, 1, \ldots, M_{symb}^{layer}-1$ according to the mapping shown in Table 3 where v is the number of layers and $M_{symb}^{layer}$ is the number of modulation symbols per layer.

TABLE 4

Codeword-to-layer mapping in the 5G NR standard

| Number of layers | Number of codewords | Codeword-to-layer mapping $i = 0,1, \ldots, M_{symb}^{layer} - 1$ | |
|---|---|---|---|
| 1 | 1 | $x^{(0)}(i) = d^{(0)}(i)$ | $M_{symb}^{layer} = M_{symb}^{(0)}$ |
| 2 | 1 | $x^{(0)}(i) = d^{(0)}(2i)$ $x^{(1)}(i) = d^{(0)}(2i + 1)$ | $M_{symb}^{layer} = M_{symb}^{(0)}/2$ |
| 3 | 1 | $x^{(0)}(i) = d^{(0)}(3i)$ $x^{(1)}(i) = d^{(0)}(3i + 1)$ $x^{(2)}(i) = d^{(0)}(3i + 2)$ | $M_{symb}^{layer} = M_{symb}^{(0)}/3$ |
| 4 | 1 | $x^{(0)}(i) = d^{(0)}(4i)$ $x^{(1)}(i) = d^{(0)}(4i + 1)$ $x^{(2)}(i) = d^{(0)}(4i + 2)$ $x^{(3)}(i) = d^{(0)}(4i + 3)$ | $M_{symb}^{layer} = M_{symb}^{(0)}/4$ |
| 5 | 2 | $x^{(0)}(i) = d^{(0)}(2i)$ $x^{(1)}(i) = d^{(0)}(2i + 1)$ $x^{(2)}(i) = d^{(1)}(3i)$ $x^{(3)}(i) = d^{(1)}(3i + 1)$ $x^{(4)}(i) = d^{(1)}(3i + 2)$ | $M_{symb}^{layer} = M_{symb}^{(0)}/2 = M_{symb}^{(1)}/3$ |
| 6 | 2 | $x^{(0)}(i) = d^{(0)}(3i)$ $x^{(1)}(i) = d^{(0)}(3i + 1)$ $x^{(2)}(i) = d^{(0)}(3i + 2)$ $x^{(3)}(i) = d^{(1)}(3i)$ $x^{(4)}(i) = d^{(1)}(3i + 1)$ $x^{(5)}(i) = d^{(1)}(3i + 2)$ | $M_{symb}^{layer} = M_{symb}^{(0)}/3 = M_{symb}^{(1)}/3$ |
| 7 | 2 | $x^{(0)}(i) = d^{(0)}(3i)$ $x^{(1)}(i) = d^{(0)}(3i + 1)$ $x^{(2)}(i) = d^{(0)}(3i + 2)$ $x^{(3)}(i) = d^{(1)}(4i)$ $x^{(4)}(i) = d^{(1)}(4i + 1)$ $x^{(5)}(i) = d^{(1)}(4i + 2)$ $x^{(6)}(i) = d^{(1)}(4i + 3)$ | $M_{symb}^{layer} = M_{symb}^{(0)}/3 = M_{symb}^{(1)}/4$ |
| 8 | 2 | $x^{(0)}(i) = d^{(0)}(4i)$ $x^{(1)}(i) = d^{(0)}(4i + 1)$ $x^{(2)}(i) = d^{(0)}(4i + 2)$ $x^{(3)}(i) = d^{(0)}(4i + 3)$ $x^{(4)}(i) = d^{(1)}(4i)$ $x^{(5)}(i) = d^{(1)}(4i + 1)$ $x^{(6)}(i) = d^{(1)}(4i + 2)$ $x^{(7)}(i) = d^{(1)}(4i + 3)$ | $M_{symb}^{layer} = M_{symb}^{(0)}/4 = M_{symb}^{(1)}/4$ |

In the precoding step, the layer symbols $x(i)=[x^{(0)}(i) \ldots x^{(v-1)}(i)]^T$, are mapped to the antenna port symbols $y(i)=)[y^{(0)}(i) \ldots y^{(P-1)}(i)]$ as below:

$$\begin{bmatrix} y^{(0)}(i) \\ \vdots \\ y^{(P-1)}(i) \end{bmatrix} = [P \times v] \times \begin{bmatrix} x^{(0)}(i) \\ \vdots \\ x^{(v-1)}(i) \end{bmatrix}$$

where [P×v] is the precoding matrix.
The block of vectors $[x^{(0)}(i) \ldots x^{(v-1)}(i)]^T$, $M_{symb}^{layer}-1$ is mapped to antennas according to $$\begin{bmatrix} y^{(p_0)}(i) \\ \vdots \\ y^{(p_{v-1})}(i) \end{bmatrix} = \begin{bmatrix} x^{(0)}(i) \\ \vdots \\ x^{(v-1)}(i) \end{bmatrix}$$

where $i=0, 1, \ldots, M_{symb}^{ap}-1$, $M_{symb}^{ap}=M_{symb}^{layer}$.

BRIEF SUMMARY

Various aspects of the present disclosure are directed to methods and system for spectrum aggregation in a wireless communication network. In one aspect of the disclosure, a method for wireless communication includes multiplexing transmit data into at least a first component carrier data and a second component carrier data. The method further includes digitally pre-coding at least the first and second component carrier data for digital beamforming. The method also includes converting, by digital to analog conversion, the digitally pre-coded first and second component carrier data to first and second analog signals. The method also includes processing the second analog signals to generate analog beamformed millimeter wave band signals and transmitting the millimeter wave band signals. The method also includes processing the first analog signals to generate sub-7 GHz band signals and transmitting the sub-7 GHz band signals, wherein the sub-7 GHz band signals are transmitted with digital beamforming and without analog beamforming, and wherein the millimeter wave band signals are transmitted with both digital and analog beamforming.

In one aspect of the present disclosure, processing the second analog signals includes up-converting the second analog signals to millimeter wave band signals and applying analog phase shift to the millimeter wave band signals for analog beamforming.

In one aspect of the present disclosure, processing the first analog signals includes up-converting the first analog signals to sub-7 GHz band signals.

In one aspect of the present disclosure, the sub-7 GHz band signals and the millimeter wave band signals are transmitted by a user equipment (UE).

In one aspect of the present disclosure, the sub-7 GHz band signals and the millimeter wave band signals are transmitted by a radio base station.

In one aspect of the disclosure, the transmit data is multiplexed into at least the first component carrier data and the second component carrier data depending on the Quality of Service (QoS) parameters associated with the data.

In one aspect of the disclosure, the transmit data is multiplexed into at least the first component carrier data and the second component carrier data based on Quality of Service (QoS) flow ID of bearer traffic.

In one aspect of the disclosure, the transmit data is multiplexed into at least the first component carrier data and the second component carrier data depending on the priority of QoS flow ID of bearer traffic.

In an additional aspect of the disclosure, a method for wireless communication includes multiplexing transmit data into at least a first component carrier data and a second component carrier data. The method further includes digitally pre-coding at least the first and second component carrier data for digital beamforming. The method also includes converting the digitally pre-coded first and second component carrier data to first and second analog signals. The method also includes up-converting the first analog signals to sub-7 GHz band signals and up-converting the second analog signals to millimeter wave band signals. The method also includes applying analog phase shift to the millimeter wave band signals for analog beamforming. The method also includes transmitting the analog beamformed millimeter wave band signals. The method also includes transmitting the sub-7 GHz band signals, wherein the sub-7 GHz band signals are transmitted with digital beamforming and without analog beamforming, and wherein the millimeter wave band signals are transmitted with both digital and analog beamforming. According to aspects of the disclosure, the sub-7 GHz band signals and the millimeter wave band signals are transmitted by a user equipment (UE), and the sub-7 GHz band signals and the millimeter wave band signals are transmitted by a radio base station. According to aspects of the disclosure, the transmit data is multiplexed into at least the first component carrier data and the second component carrier data based on Quality of Service (QoS) flow ID of bearer traffic. According to aspects of the disclosure, the transmit data is multiplexed into at least the first component carrier data and the second component carrier data based on the priority of QoS parameters associated with the transmit data.

In an additional aspect of the disclosure, an apparatus configured for wireless communication includes means for multiplexing transmit data into at least a first component carrier data and a second component carrier data. The apparatus further includes means for digitally pre-coding at least the first and second component carrier data for digital beamforming. The apparatus also includes means for converting the digitally pre-coded first and second component carrier data to first and second analog signals. The apparatus also includes means for transmitting analog beamformed millimeter wave band signals, wherein the analog beamformed millimeter wave band signals are generated by processing the second analog signals. The apparatus also includes means for transmitting sub-7 GHz band signals, wherein the sub-7 GHz band signals are generated by processing the first analog signals, wherein the sub-7 GHz band signals are transmitted with digital beamforming and without analog beamforming, and wherein the millimeter wave band signals are transmitted with both digital and analog beamforming. The means for processing includes means for up-converting the second analog signals to millimeter wave band signals and means for applying analog phase shift to the millimeter wave band signals for analog beamforming. The means for processing also includes means for up-converting the first analog signals to sub-7 GHz band signals.

In an additional aspect of the disclosure, a method for wireless communication includes receiving sub-7 GHz band signals and millimeter wave band signals. The method further includes down-converting the sub-7 GHz band signals to generate first down-converted analog signals. The method also includes applying analog phase shift to the millimeter wave band signals and down-converting the phase shifted millimeter wave band signals to generate second down-converted analog signals. The method also includes processing the first down-converted analog signals to generate sub-7 GHz component carrier data and processing the second down-converted analog signals to generate millimeter wave component carrier data. The method also includes de-multiplexing the sub-7 GHz component carrier data and the millimeter wave component carrier data for baseband processing, wherein the sub-7 GHz band signals are down-converted to the first analog signals without application of analog phase shift. The processing of the first down-converted analog signals includes converting, by analog to digital conversion, the first down-converted analog signals to first digital signals and de-modulating the first digital signals and channel decoding the demodulated first digital signals to generate the sub-7 GHz component carrier data, wherein the sub-7 GHz component carrier data is generated without analog phase control. The processing of the second down-converted analog signals includes converting, by analog to digital conversion, the second down-converted analog signals to second digital signals and de-modulating the second digital signals and channel decoding the de-modulated second digital signals to generate the millimeter wave component carrier data.

In an additional aspect of the disclosure, a method for wireless communication includes receiving sub-7 GHz band signals and millimeter wave band signals. The method further includes down-converting the sub-7 GHz band signals to generate first down-converted analog signals. The method also includes applying analog phase shift to the millimeter wave band signals and down-converting the phase shifted millimeter wave band signals to generate second down-converted analog signals. The method also includes converting, by analog to digital conversion, the first and second analog signals to first and second digital signals, respectively. The method also includes demodulating the first digital signals to generate sub-7 GHz carrier data and demodulating the second digital signals to generate millimeter wave component carrier data. The method also includes de-multiplexing the sub-7 GHz component carrier data and the millimeter wave component carrier data for baseband processing, wherein the sub-7 GHz band signals are down-converted to the first analog signals without application of analog phase shift.

In an additional aspect of the disclosure, an apparatus configured for wireless communication includes means for receiving sub-7 GHz band signals and millimeter wave band signals. The apparatus further includes means for down-converting the sub-7 GHz band signals to generate first down-converted analog signals. The apparatus also includes means for applying analog phase shift to the millimeter wave band signals and down-converting the phase shifted millimeter wave band signals to generate second down-converted analog signals. The apparatus also includes means for processing the first down-converted analog signals to generate sub-7 GHz component carrier data and means for processing the second down-converted analog signals to generate millimeter wave component carrier data. The apparatus also includes means for de-multiplexing the sub-7 GHz component carrier data and the millimeter wave component carrier data for baseband processing, wherein the sub-7 GHz band signals are down-converted to the first analog signals without application of analog phase shift.

In an additional aspect of the disclosure, a method for wireless communication includes multiplexing transmit data into at least a first component carrier data and a second component carrier data depending on Quality of Service (QoS) parameters of the transmit data, wherein the QoS parameters include at least one of Guaranteed Bit Rate (GBR), non-Guaranteed Bit Rate (non-GBR), Priority Handling, Packet Delay Budget and Packet Error Loss rate. The method further includes digitally pre-coding at least the first and second component carrier data for digital beamforming. The method also includes converting the digitally pre-coded first and second component carrier data to first and second analog signals. The method also includes up-converting the first analog signals to sub-7 GHz band signals and up-converting the second analog signals to millimeter wave band signals. The method also includes applying analog phase shift to the millimeter wave band signals for analog beamforming. The method also includes transmitting the analog beamformed millimeter wave band signals. The method also includes transmitting the sub-7 GHz band signals, wherein the sub-7 GHz band signals are transmitted with digital beamforming and without analog beamforming, and wherein the millimeter wave band signals are transmitted with both digital and analog beamforming.

DETAILED DESCRIPTION

The present disclosure is directed to a wireless communication network comprising a plurality of radio base station that communicate with a plurality of communication devices. Various aspects of the disclosure are directed to a radio base station and communication devices that use digital beamforming for sub-7 GHz spectrum bands (FR1 bands) and use both digital and analog beamforming for millimeter wave spectrum bands (FR2 bands).

Figure 1:
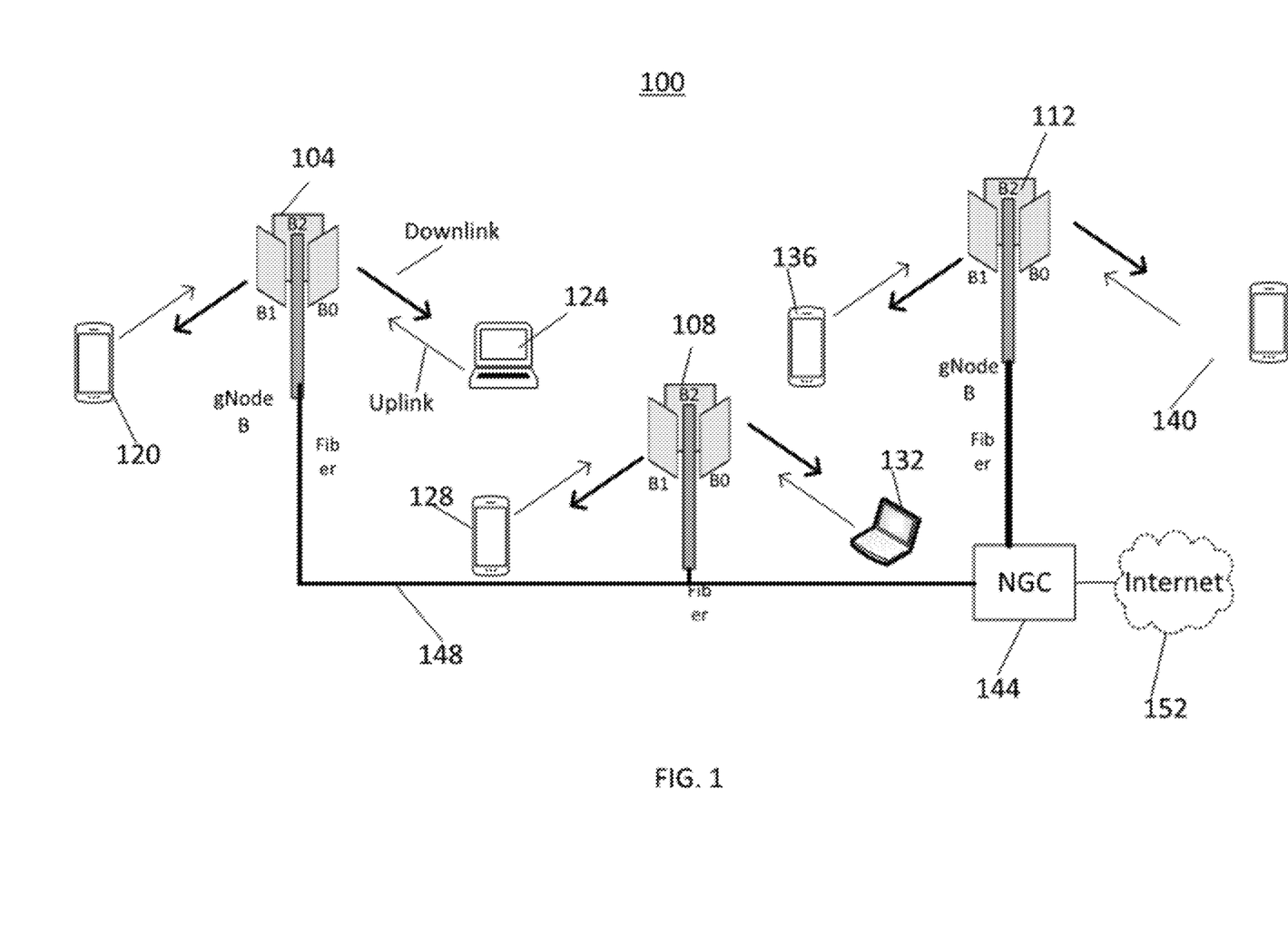
FIG. 1 illustrates a wireless communication system according to an embodiment of the present disclosure.

FIG. 1 illustrates a wireless communication system 100 according to an embodiment of the present disclosure. The wireless communication system 100 uses both millimeter wave spectrum above 24 GHz and sub-7 GHz spectrum. The wireless communication system 100 may use millimeter wave spectrum above 24 GHz for both uplink or downlink, sub-7 GHz spectrum for both uplink or downlink, or both millimeter wave spectrum above 24 GHz and sub-7 GHz spectrum for uplink and downlink, or millimeter wave spectrum above 24 GHz for downlink and sub-7 GHz spectrum for uplink.

Referring to FIG. 1, the wireless system 100 includes radio base stations 104, 108 and 112 (also referred to as gNode Bs) that communicate with communication devices 120, 124, 128, 132, 136 and 140. By way of example, radio base stations 104, 108 and 112 can provide 360 degrees coverage by using three sectors each sector covering 120 degrees. Each sector may be further divided into P sub-sectors with each sub-sector covering 120/P degrees. For example, for the case when a sector is further divided into three sub-sectors, each sector provides 40 degrees coverage. The radio base stations gNode Bs 104, 108 and 112 are connected to a network 144 (e.g., Next Generation Core (NGC) network) using a communication link 148 (e.g., high-speed Fiber backhaul link). The network 144 may be connected to the Internet 152. The radio base station 104 serves communication devices 120 and 124, the radio base station 108 serves communication devices 128 and 132, and the radio base station 112 serves communication devices 136 and 140. The communication devices may, for example, be smartphones, laptop computers, desktop computers, augmented reality/virtual reality (AR/VR) devices, routers, or any other communication devices.

Figure 2:
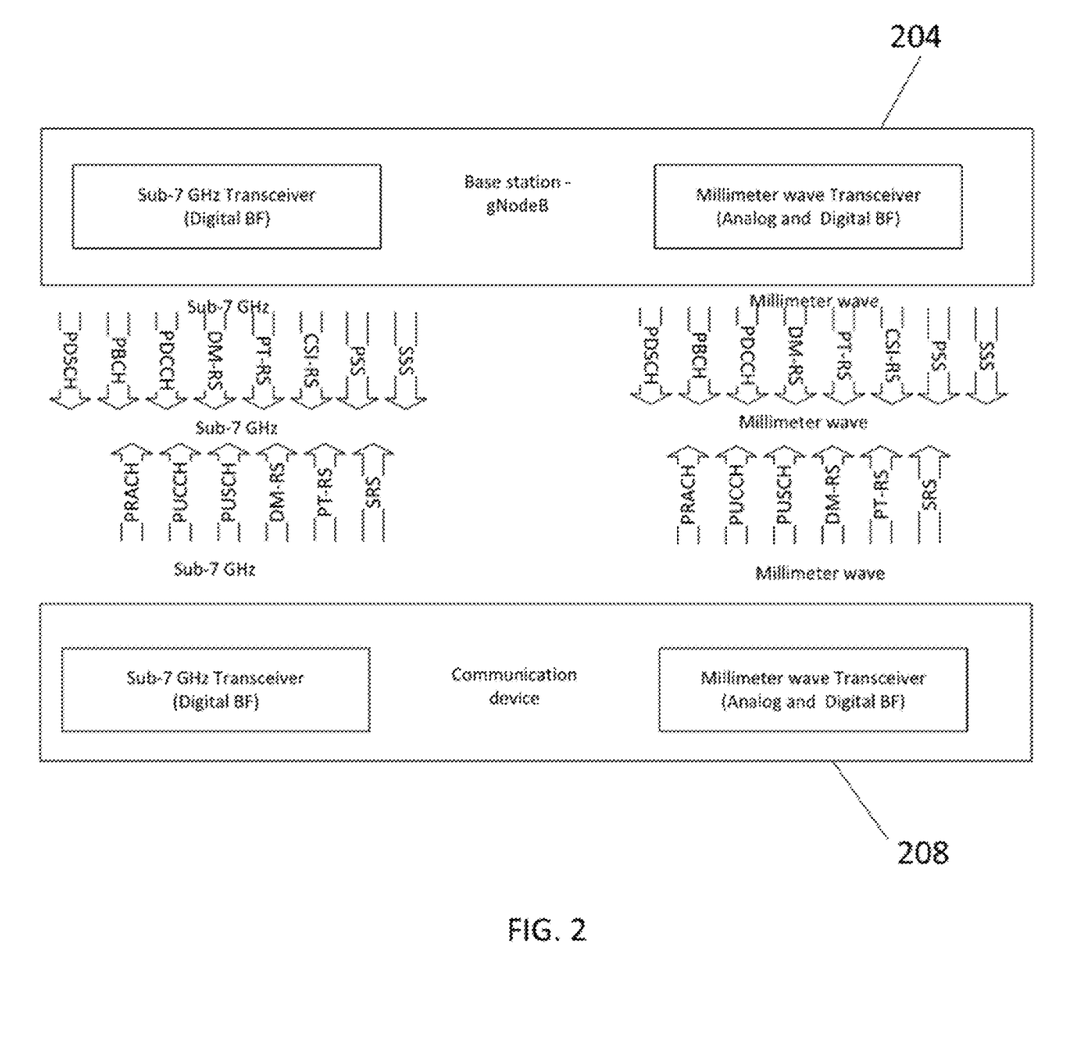
FIG. 2 illustrates uplink physical channels and uplink physical signals and downlink physical channels and downlink physical signals transmission and reception according to an embodiment of the present disclosure.

FIG. 2 illustrates uplink physical channels and uplink physical signals transmission and reception, and downlink physical channels and downlink physical signals transmission and reception according to an embodiment of the present disclosure. By way of example, a radio base station 204 communicates with a communication device 208 on the downlink and on the uplink. An uplink physical channel corresponds to a set of resource elements carrying information originating from higher layers. The uplink physical channels transmitted from a communication device 208 and received by the radio base station 204 include: Physical Uplink Shared Channel (PUSCH), Physical Uplink Control Channel (PUCCH), Physical Random Access Channel (PRACH). An uplink physical signal is used by the physical layer but does not carry information originating from higher layers. The uplink physical signals transmitted from the communication device 208 and received by the radio base station 204 include: Demodulation reference signals (DM-RS), Phase-tracking reference signals (PT-RS) and Sounding reference signal (SRS).

A downlink physical channel corresponds to a set of resource elements carrying information originating from higher layers. The downlink physical channels transmitted from the radio base station 204 and received by the communication device 208 include: Physical Downlink Shared Channel (PDSCH), Physical Broadcast Channel (PBCH) and Physical Downlink Control Channel (PDCCH). A downlink physical signal corresponds to a set of resource elements used by the physical layer but does not carry information originating from higher layers. The downlink physical signals transmitted from the radio base station 204 and received by the communication device 208 include: Demodulation reference signals (DM-RS), Phase-tracking reference signals (PT-RS) Channel-state information reference signal (CSI-RS) Primary synchronization signal (PSS) and Secondary synchronization signal (SSS).

Referring to FIG. 2, the downlink physical channels and downlink physical signals and uplink physical channels and uplink physical signals are transmitted in the millimeter wave spectrum such as 26, 28, 37 and 39 GHz bands using both digital and analog beamforming. The downlink physical channels and downlink physical signals and uplink physical channels and uplink physical signals are transmitted in the sub-7 GHz spectrum using digital beamforming only. In other embodiments, the downlink physical channels and downlink physical signals are carried in the millimeter wave spectrum such as 26, 28, 37 and 39 GHz bands while the uplink physical channels and uplink physical signals are carried in the sub-7 GHz spectrum such as 3.4-4.2 GHz bands.

The 3GPP TS 36.211 LTE standard defines antenna ports for the downlink. An antenna port is generally used as a generic term for signal transmission under identical channel conditions. For each LTE operating mode in the downlink direction for which an independent channel is assumed (e.g. SISO vs. MIMO), a separate logical antenna port is defined. LTE symbols that are transmitted via identical antenna ports are subject to the same channel conditions. In order to determine the characteristic channel for an antenna port, a UE must carry out a separate channel estimation for each antenna port. Separate reference signals (pilot signals) that are suitable for estimating the respective channel are defined in the LTE standard for each antenna port.

Figure 3:
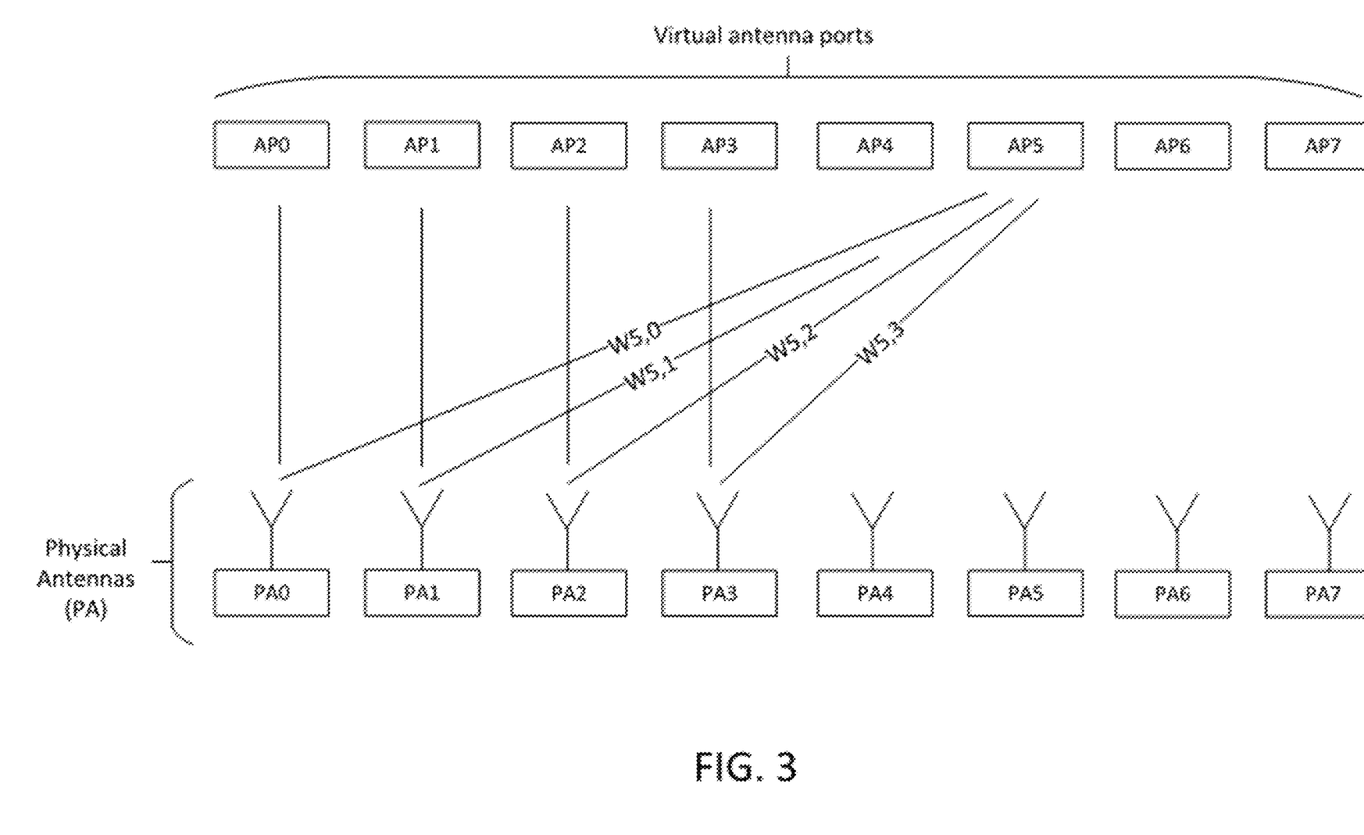
FIG. 3 illustrates mapping between virtual antenna ports and physical RF/antennas.

FIG. 3 illustrates mapping between virtual antenna ports and physical RF/antennas. These virtual antenna ports do not correspond to physical antennas, but rather are logical entities distinguished by their reference signal sequences. Multiple antenna port signals can be transmitted on a single transmit antenna and a single antenna port can be spread across multiple transmit antennas (Virtual antennas port 5 in FIG. 3, for example).

Figure 4A:
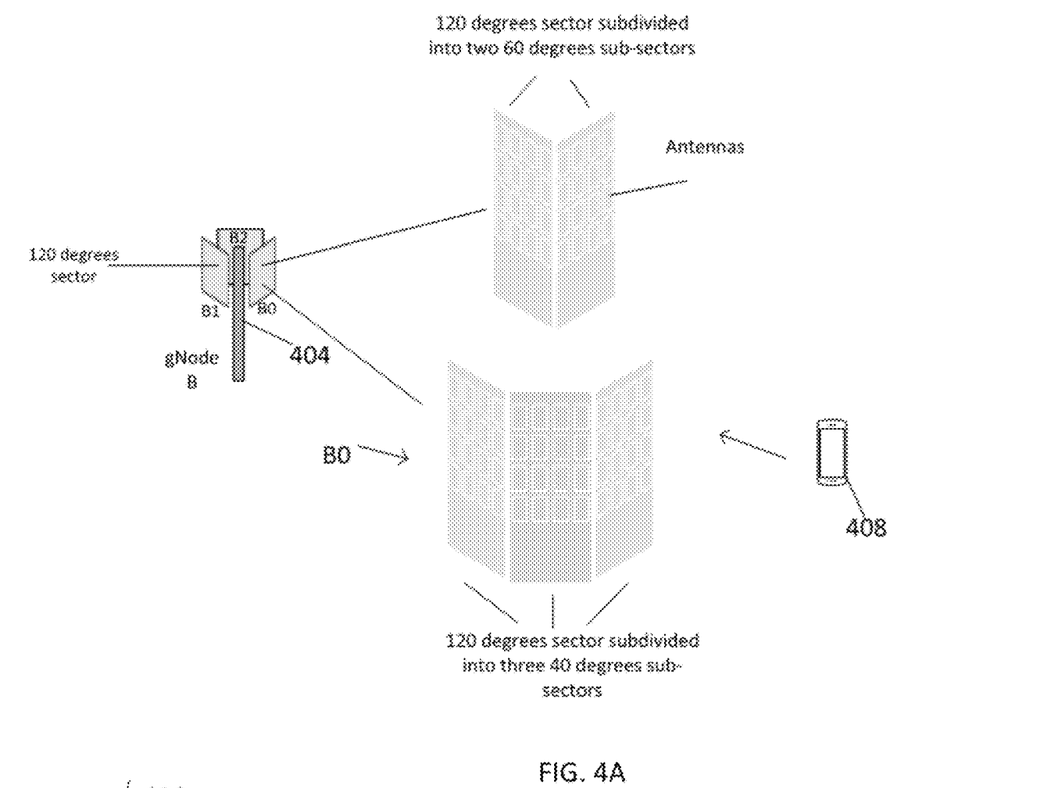
FIG. 4A-B illustrate a base station and a communication device according to an embodiment of the present disclosure.
Figure 4B:
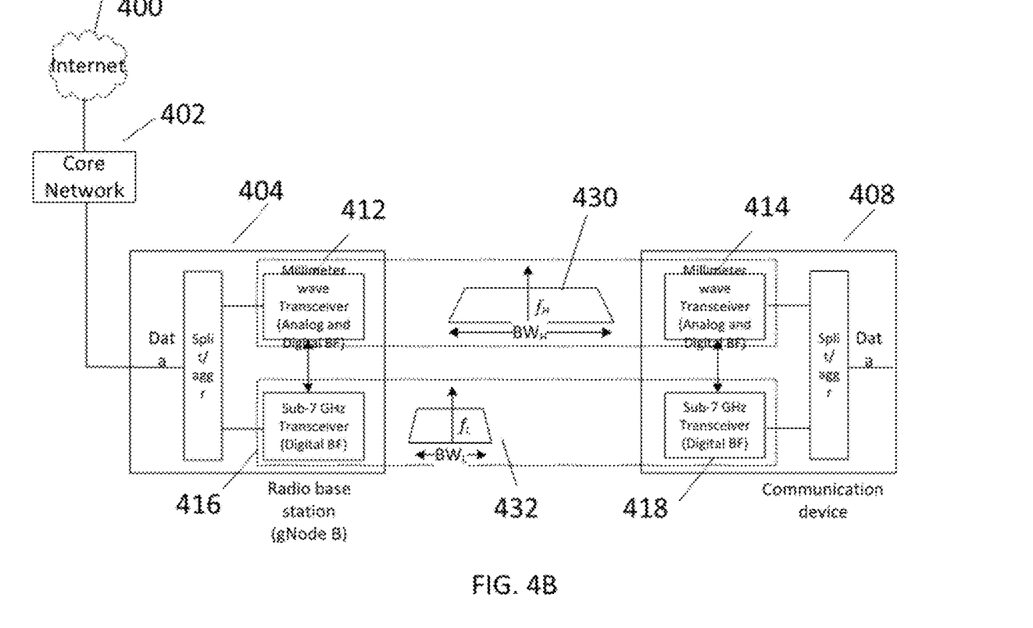

FIG. 4A-B illustrate the base station 404 and the communication device 408 according to an embodiment of the present disclosure. The base station 404 may include a plurality of sectors, each providing coverage for a zone or sector. By way of example, the base station 404 has three sectors B0, B1 and B2. Each sector provides coverage in the 120 degrees zone with 3-sectors providing 360 degrees coverage. Each sector may include a plurality of sub-sectors. For example, to provide coverage in the 120 degrees zone, a sector may consist of 2 sub-sectors with each sub-sector providing coverage in the 60 degrees zone or 3 sub-sectors with each sub-sector providing coverage in the 40 degrees zone. Although the exemplary base stations are shown to have three sectors, it will be understood that the base stations may include only one sector or any suitable number of sectors. Each sub-sector may include a plurality of antenna sub-arrays. The base station 404 is communicating with a communication device 408.

According to embodiments of the present disclosure, the base station 404 and the communication device 408 use both millimeter wave spectrum above 24 GHz and sub-7 GHz spectrum for uplink and downlink. Thus, the base station 404 transmits downlink signals on both the millimeter wave spectrum above 24 GHz and the sub-7 GHz spectrum. Likewise, the communication device transmits uplink signals on both the millimeter wave spectrum and the sub-7 GHz spectrum.

According to embodiment of the present disclosure, the base station 404 and the communication device 408 are configured to form beams in the digital domain (i.e., digital beamforming) in the sub-7 GHz spectrum such as 3.4-4.2 GHz bands. A communication device is referred to as User Equipment (UE) in 3GPP standards specifications. Further, the base station 404 and the communication device 408 are configured to form beams in both the digital and analog domains (i.e., digital and analog beamforming) in the millimeter wave spectrum above 24 GHz (e.g., 24, 26, 28, 37 and 39 GHz bands). As shown in FIG. 4B, the communication device 408 sends data to or receives data from the Internet 400 via a Core Network 402 and the base station 404. In the downlink, the base station 404 splits data into two parts. The first part is carried over millimeter wave bands (FR2) 430 via transceiver 412 at the base station 404 using both analog and digital beamforming while the second part is carried over sub-7 GHz bands (FR1) 432 via transceiver 416 using digital beamforming only.

The communication device 408 receives first part over the millimeter wave bands (FR2) 430 via transceiver 414 using both analog and digital beamforming and receives the second part via transceiver 418 carried over sub-7 GHz bands (FR1) 432 via transceiver 418 using digital beamforming only. The communication device 408 then aggregates data received over both millimeter wave band (FR2) transceiver 414 and sub-7 GHz band (FR1) transceiver 418.

The bandwidth $BW_H$ used on Millimeter wave bands (FR2) 430 centered at $f_H$ is generally much larger than the bandwidth $BW_L$ ($BW_H \gg BW_L$) used on sub-7 GHz bands (FR1) 432 centered at $f_L$. The use of both analog and digital beamforming reduces implementation complexity for millimeter wave bands (FR2) as fewer data converters (ADC/DACs) are required in the system. For the sub-7 GHz bands (FR1), more data converters (ADC/DACs) can be used for full digital beamforming as each data converter operates at a lower speed thanks to the smaller bandwidths used at sub-7 GHz bands (FR1).

Figure 5A:
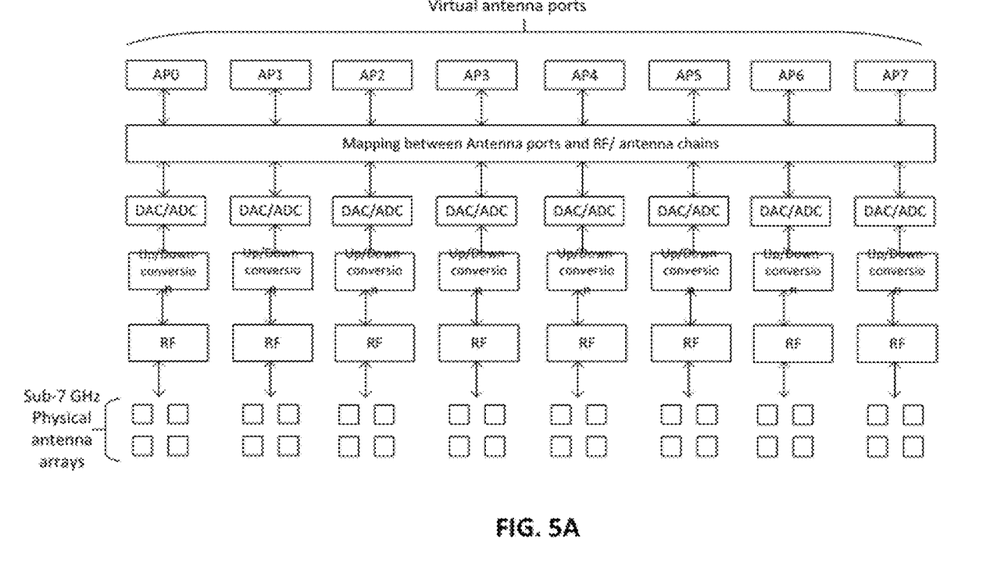
FIG. 5A-5B illustrate mapping between virtual antenna ports and physical antenna arrays.
Figure 5B:
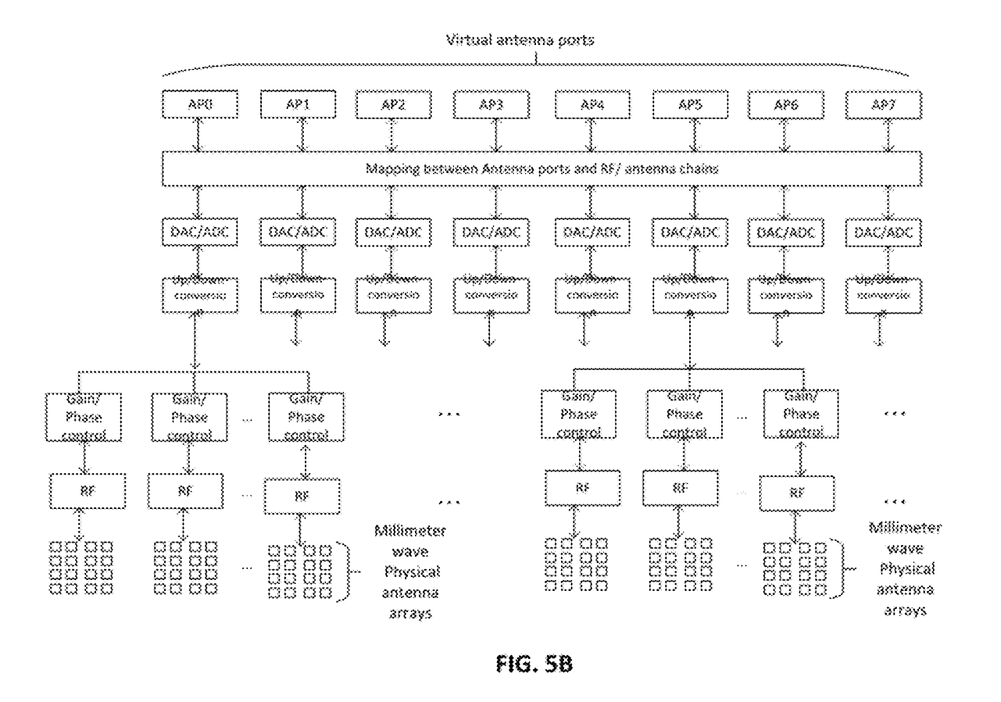

FIG. 5A-5B illustrate mapping between virtual antenna ports and physical antenna arrays for the sub-7 GHz spectrum and the millimeter wave spectrum. In the case of millimeter wave spectrum, the transmit signals in the analog domain after up-conversion are split and undergo amplitude and phase control for analog beamforming. The received signals undergo amplitude and phase control and are combined for analog beamforming before down-conversion. For the sub-7 GHz spectrum, signals do not undergo any amplitude and phase shift. At millimeter wave frequencies, radio spectrum use is lighter, and very wide bandwidths along with a large number of smaller antennas can be used to provide the orders of magnitude increase in capacity. The smaller size of antennas is enabled by carrier waves that are millimeters long compared to centimeter-long waves at sub-7 GHz frequencies. A drawback of millimeter waves frequencies, however, is that they tend to lose more energy than do lower frequencies over long distances because they are readily absorbed or scattered by gases, rain, and foliage as well as experience higher losses when penetrating through structures such as walls or any other building materials. The higher propagation loss at millimeter wave frequencies can be compensated by extremely large beamforming gains enabled by a large number of smaller antenna elements utilizing a combination of digital and analog beamforming. Analog beamforming can be implemented by just phase control of the analog signals or a combination of phase control and amplitude control. At sub-7 GHz frequencies, antenna size is relatively large due to large wavelengths and only a smaller number of antenna elements are generally used for beamforming making these frequencies amenable to digital beamforming only.

Figure 6:
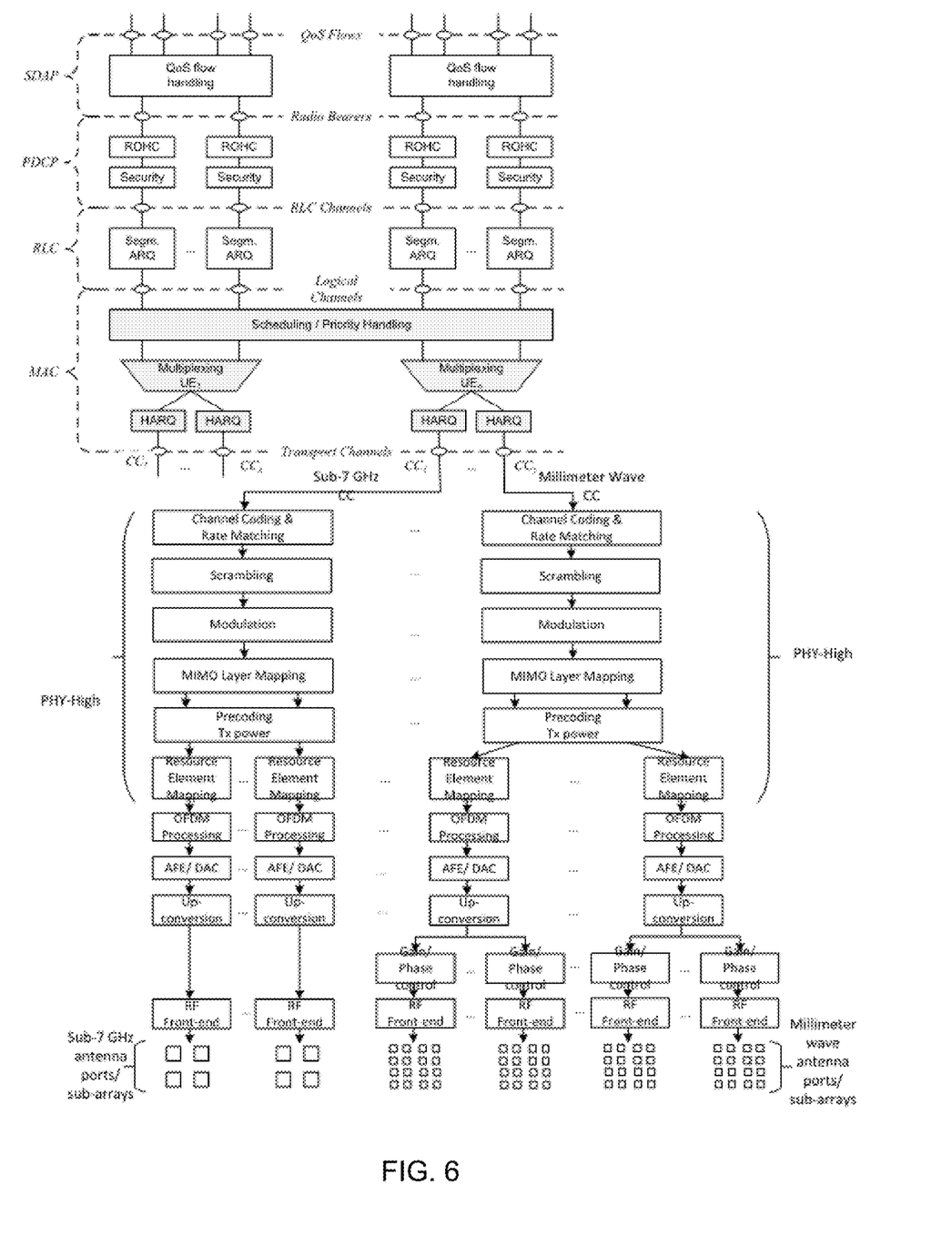
FIGS. 6 and 7 illustrate spectrum aggregation according to disclosed embodiments.

FIG. 6 illustrates spectrum aggregation according to disclosed embodiments. The data of the nth user equipment (UEn) is carried over multiple component carriers (CCs). At least one component carrier (CCy in FIG. 6) is in the millimeter wave bands (FR2) and uses both analog and digital beamforming and at least one component carrier (CC1 in FIG. 6) is in the sub-7 GHz bands (FR1) and uses only digital beamforming. The Service Data Adaptation Protocol (SDAP) receives data from the core network and passes on to the Packet Data Convergence Protocol (PDCP) layer. The main services and functions of SDAP include mapping between a Quality of Service (QoS) flow and a data radio bearer and marking QoS flow ID (QFI) in both downlink and uplink packets.

A bearer is a virtual concept that defines how the UE (User Equipment) data is treated when it travels across the network. Network might treat or handle some data with priority or in a special way and treat or handle others normally. Some flow of data might be provided guaranteed bit rate while other may just be best effort. In short, bearer is a set of network parameter that defines data specific treatment. When UE attaches to the network for the first time, it is assigned default bearer which remains as long as UE is attached. Default bearer is best effort service and comes with an IP address. On the other hand, a dedicated bearer provides dedicated tunnel to one or more specific traffic (i.e. VoIP, video etc.). Dedicated bearer acts as an additional bearer on top of default bearer and does not require separate IP address and therefore dedicated bearer is always linked to one of the default bearer established previously. Dedicated bearer can be Guaranteed Bit Rate (GBR) or non-GBR (whereas default bearer can only be non-GBR). For services like VoLTE (Voice over LTE) or Vo5G (Voice over 5G), dedicated bearers are used.

To ensure that bearer traffic in 5G networks is appropriately handled, different types of bearers are classified into different classes, with each class having appropriate QoS parameters for the traffic type. Examples of the QoS parameters include Guaranteed Bit Rate (GBR) or non-Guaranteed Bit Rate (non-GBR), Priority Handling, Packet Delay Budget and Packet Error Loss rate. When a Guaranteed Bit Rate (GBR) dedicated bearer is used, the bandwidth of resources is reserved on the network. Examples of GBR service include voice or video call traffic. In the non-Guaranteed Bit Rate (non-GBR) case, resources are not reserved, and the service is provided on a best-effort basis. An example of non-GBR service is TCP-based Video Buffered Streaming.

The main services and functions of the PDCP sublayer for the user plane include: sequence numbering, header compression, header decompression, reordering, duplicate detection, retransmission of PDCP SDUs (Service Data Units), ciphering, deciphering, integrity protection, PDCP SDU discard, duplication of PDCP PDUs (Protocol Data Units), PDCP re-establishment and PDCP data recovery for RLC AM (Acknowledged Mode).

The Packet Data Convergence Protocol (PDCP) layer passes data on to the Radio Link Control (RLC) layer. The RLC sublayer supports three transmission modes: Transparent Mode (TM), Unacknowledged Mode (UM) and Acknowledged Mode (AM). The main services and functions of the RLC sublayer depend on the transmission mode and include: transfer of upper layer PDUs, sequence numbering independent of the one in PDCP (UM and AM), error Correction through ARQ (AM only), segmentation (AM and UM) and re-segmentation (AM only) of RLC SDUs, reassembly of SDU (AM and UM), duplicate detection (AM only), RLC SDU discard (AM and UM), RLC re-establishment and protocol error detection (AM only).

Medium Access Control (MAC) layer receives data from the Radio Link Control (RLC) layer. The main services and functions of the MAC sublayer include: mapping between logical channels and transport channels, multiplexing/de-multiplexing of MAC SDUs into/from transport blocks (TB) delivered to/from the physical layer, padding, scheduling information reporting, error correction through Hybrid ARQ, priority handling between UEs by means of dynamic scheduling and priority handling between logical channels. Medium Access Control (MAC) layer splits data of the nth user equipment (UEn) on to at least one component carrier (CCy in FIG. 6) in the Millimeter wave bands (FR2) and at least one component carrier (CC1 in FIG. 6) on to the sub-7 GHz bands (FR1). In case a UE is supporting both Guaranteed Bit Rate (GBR) and the non-Guaranteed Bit Rate (non-GBR) service, the GBR service such as a voice call can be varied over the component carrier CC1 in FIG. 6 in the sub-7 GHz bands (FR1) band while non-GBR data traffic such as TCP-based Ultra High Definition (UHD) Video Streaming is carried over the component carrier CCy in FIG. 6 in the Millimeter wave bands (FR2).

Both the Millimeter wave bands (FR2) component carrier (CCy in FIG. 6) and the sub-7 GHz bands (FR1) component carrier (CC1 in FIG. 6) undergo separate Physical (PHY) layer processing. The main services and functions of the high physical layer (PHY-high) include: transport block CRC attachment, code block segmentation, code block CRC attachment, channel coding, physical-layer hybrid-ARQ processing, rate matching, bit-interleaving, modulation (QPSK, 16QAM, 64QAM and 256QAM etc.), MIMO (Multiple Input Multiple Output) layer mapping, MIMO & digital beamforming pre-coding and mapping of modulation symbols to assigned resources and antenna ports. The lower physical layer (PHY-Low) implements OFDM (Orthogonal Frequency Division Multiplexing) processing that includes FFT/IFFT (Fast Fourier Transform/Inverse Fast Fourier Transform) functions as well as addition and removal of cyclic prefix (CP).

The digital samples after OFDM processing are received by an analog front-end (AFE) that may implement digital up-conversion (DUC) and digital to analog conversion (DAC) of the signals. In other embodiments, AFE only implements digital to analog conversion of the baseband signals with up-conversion to radio frequency (RF) signals in the analog-domain. The radio frequency (RF) signals on component carrier (CC1 in FIG. 6) on the sub-7 GHz bands (FR1) are transmitted from the sub-7 GHz band antenna ports or antenna arrays without any beamforming in the analog or RF-domain. Note that sub-7 GHz bands (FR1) signals undergo MIMO & digital beamforming pre-coding before mapping of modulation symbols to assigned resources and antenna ports as described earlier. At sub-7 GHz frequencies, antenna size is relatively large due to large wavelengths and only a smaller number of antenna elements are generally used for beamforming making these frequencies amenable to digital beamforming only. The radio frequency (RF) signals on each of the antenna ports for the component carrier (CCy in FIG. 6) in the Millimeter wave bands (FR2) are split into multiple RF signals. Each of these RF signals then undergo phase control and optional amplitude control before transmission form the Millimeter wave bands (FR2) for analog beamforming. In other embodiments, phase control and optional amplitude control can be applied on the analog signals before up-conversion to RF or the phase control can be implemented in the Local Oscillator (LO) signals use in the up-conversion.

According to embodiments of the present disclosure, the spectrum aggregation for the user equipment 1 (UE1) through user equipment (n−1) are done in a similar way. In other embodiments, some UEs may be scheduled on the sub-7 GHz bands (FR1) only using digital beamforming while others UEs may be scheduled on the millimeter wave bands (FR2) using both analog and digital beamforming.

According to disclosed embodiments. Medium Access Control (MAC) layer splits data from the user equipment on to at least one component carrier in the Millimeter wave bands (FR2) and at least one component carrier on to the sub-7 GHz bands (FR1). The sub-7 GHz bands (FR1)

component carrier uses only digital beamforming while the component carrier in the Millimeter wave bands (FR2) uses both analog and digital beamforming.

Figure 7:
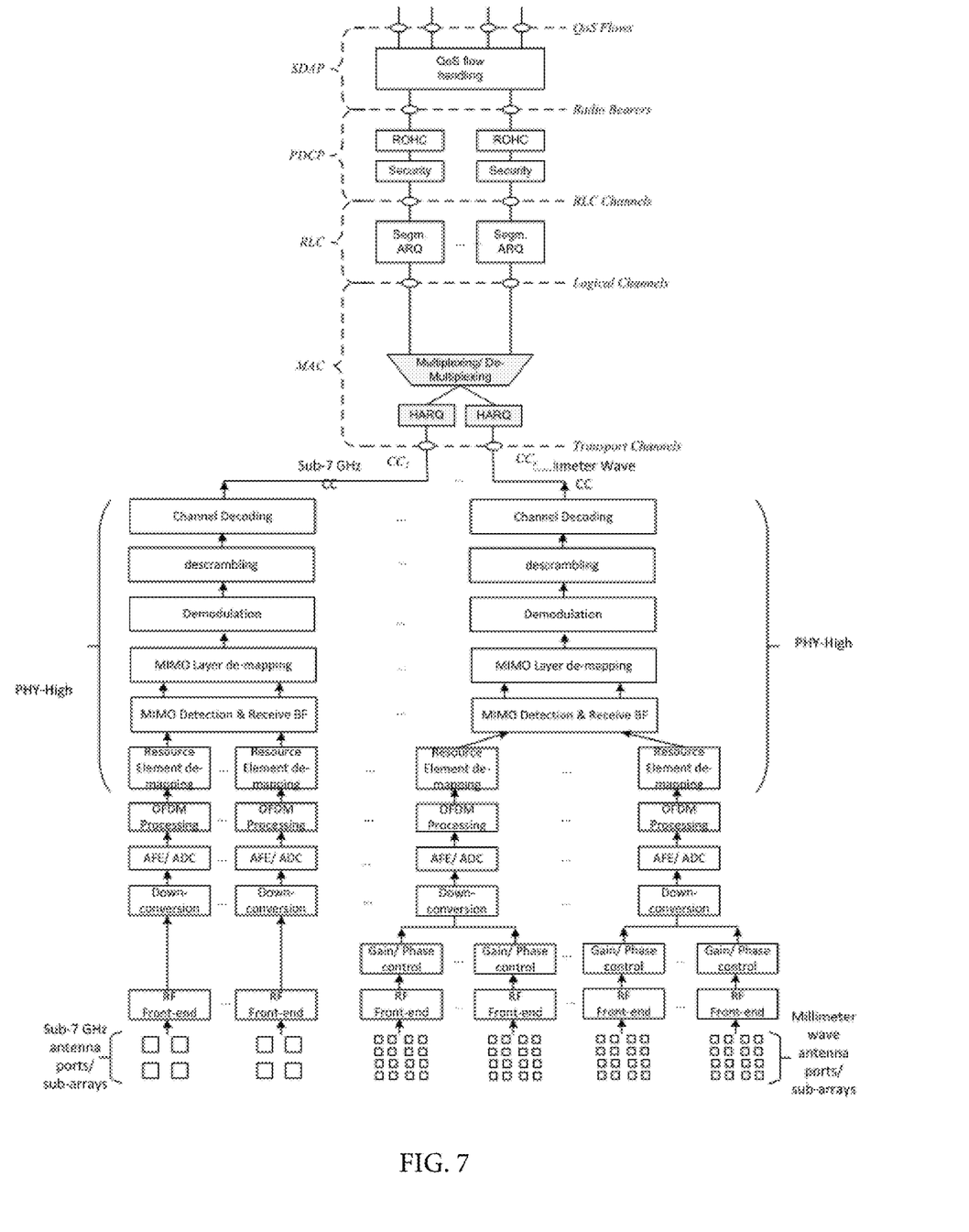

FIG. 7 illustrates spectrum aggregation at the receiver according to the disclosed embodiments. The receiver may, for example, be a UE in the downlink or a base station in the uplink. The radio frequency (RF) signals on component carrier (CC1 in FIG. 7) on the sub-7 GHz bands (FR1) are received at the sub-7 GHz band antenna ports or antenna arrays without any beamforming in the analog or RF-domain. The radio frequency (RF) signals on each of the antenna ports for the component carrier (CCx in FIG. 7) in the Millimeter wave bands (FR2) undergo phase control and optional amplitude control. The resulting signals are then combined for receive analog beamforming. The beamformed signals are then down-converted to an intermediate frequency (IF) or directly to analog baseband. In case of down-conversion to an intermediate frequency (IF), an analog front-end (AFE) may implement digital down-conversion (DDC) and analog to digital conversion (ADC) of the signals. In case of direct down-conversion to analog baseband, AFE implements analog to digital conversion (ADC) only. In other embodiments, the signals can be filtered in the analog or digital-domain.

The digital samples from the ADCs undergo OFDM processing and resource element de-mapping. In further steps, PHY-high processing such as MIMO detection, digital beamforming, demodulation, descrambling and channel decoding is performed. PHY-high layer then delivers data to the Hybrid ARQ in the MAC layer. There is a separate Hybrid ARQ entity for each component carrier. The MAC layer then aggregates data from the Hybrid ARQ entity for the component carrier (CC1 in FIG. 7) on the sub-7 GHz bands (FR1) and the component carrier (CCx in FIG. 7) in the Millimeter wave bands (FR2).

Figure 8:
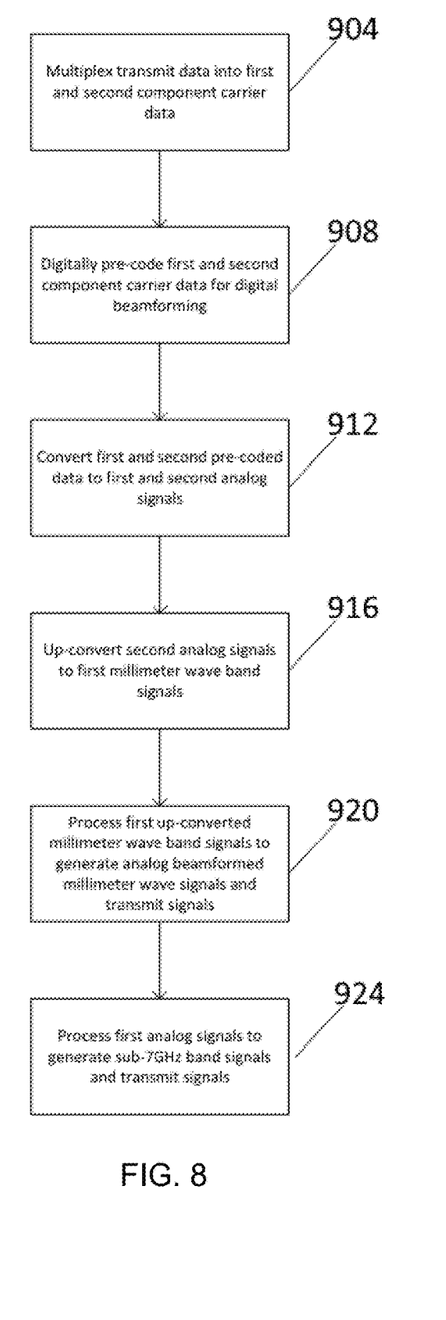
FIGS. 8 and 9 are functional block diagrams illustrating example blocks executed to implement aspects of the present disclosure.

FIG. 8 is a functional block diagram illustrating example blocks executed to implement one aspect of the present disclosure. In block 904, transmit data is multiplexed into at least a first component carrier data and a second component carrier data. In block 908, at least the first and second component carrier data are digitally pre-coded for digital beamforming. In block 912, the digitally pre-coded first and second component carrier data are converted to first and second analog signals. In block 916, second analog signals are up-converted to first millimeter wave band signals. In block 920, first up-converted millimeter wave band signals are processed to generate analog beamformed millimeter wave signals which are transmitted wirelessly. In block 924, the first analog signals are processed to generate sub-7 GHz band signals which are transmitted wirelessly.

Figure 9:
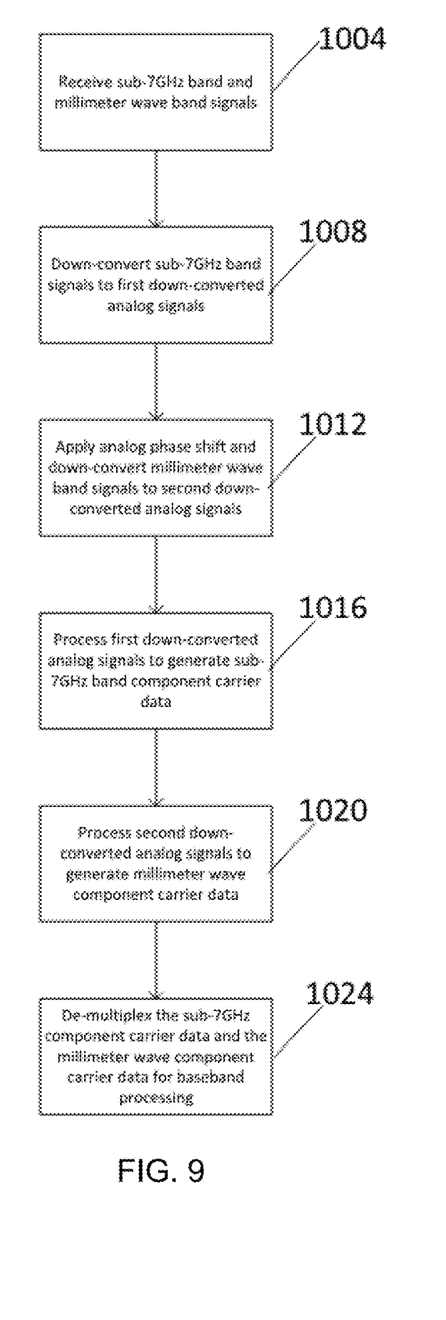

FIG. 9 is a functional block diagram illustrating example blocks executed to implement another aspect of the present disclosure. In block 1004, sub-7 GHz band signals and millimeter wave band signals are received. In block 1008, the sub-7 GHz band signals are down-converted to generate first down-converted analog signals. In block 1012, analog phase shift is applied to the millimeter wave band signals which are then down-converted to generate second down-converted analog signals. In step 1016, the first down-converted analog signals are processed to generate sub-7 GHz component carrier data. In step 1020, the second down-converted analog signals are processed to generate millimeter wave component carrier data. In step 1024, the sub-7 GHz component carrier data and the millimeter wave component carrier data are de-multiplexed for baseband processing.

Of course, those of skill in the art will recognize that, unless specifically indicated or required by the sequence of operations, certain steps in the processes described above may be omitted, performed concurrently or sequentially, or performed in a different order. Further, no component, element, or process should be considered essential to any specific claimed embodiment, and each of the components, elements, or processes can be combined in still other embodiments.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Those skilled in the art to which this application relates will appreciate that other and further additions, deletions, substitutions and modifications may be made to the described embodiments.

The invention claimed is:
1. A method for wireless communication, comprising:
multiplexing transmit data into at least a first component carrier data and a second component carrier data;
digitally pre-coding at least the first and second component carrier data for digital beamforming;
converting, by digital to analog conversion, the digitally pre-coded first and second component carrier data to first and second analog signals;
processing the second analog signals to generate analog beamformed millimeter wave band signals and transmitting the millimeter wave band signals; and
processing the first analog signals to generate sub-7 GHz band signals and transmitting the sub-7 GHz band signals, wherein the sub-7 GHz band signals are transmitted with digital beamforming and without analog beamforming, and wherein the millimeter wave band signals are transmitted with both digital and analog beamforming.

2. The method of claim 1, wherein processing the second analog signals comprises:
up-converting the second analog signals to millimeter wave band signals; and
applying analog phase shift to the millimeter wave band signals for analog beamforming.

3. The method of claim 1, wherein processing the first analog signals comprises up-converting the first analog signals to sub-7 GHz band signals.

4. The method of claim 1, wherein a Medium Access Control (MAC) layer multiplexes the data into at least the first component carrier data and the second component carrier data.

5. The method of claim 1, further comprising varying the amplitude of the millimeter wave band signals for analog gain control.

6. The method of claim 1, further comprising channel coding and rate matching the first and second component carrier data.

7. The method of claim 1, wherein the sub-7 GHz band signals and the millimeter wave band signals are transmitted by a user equipment (UE).

8. The method of claim 1, wherein the sub-7 GHz band signals and the millimeter wave band signals are transmitted by a radio base station.

9. The method of claim 1, further comprising multiplexing the transmit data into at least the first component carrier data and the second component carrier data depending on the Quality of Service (QoS) parameters associated with the data.

10. The method of claim 1, further comprising multiplexing the transmit data into at least the first component carrier data and the second component carrier data based on Quality of Service (QoS) flow ID of bearer traffic.

11. The method of claim 1, further comprising multiplexing the transmit data into at least the first component carrier data and the second component carrier data depending on the priority of Quality of Service (QoS) flow ID of bearer traffic.

12. The method of claim 1, further comprising transmitting the millimeter wave signals with a higher bandwidth than the sub-7 GHz band signals.

13. A method for wireless communication, comprising:
multiplexing transmit data into at least a first component carrier data and a second component carrier data;
digitally pre-coding at least the first and second component carrier data for digital beamforming;
converting the digitally pre-coded first and second component carrier data to first and second analog signals;
up-converting the first analog signals to sub-7 GHz band signals and up-converting the second analog signals to millimeter wave band signals;
applying analog phase shift to the millimeter wave band signals for analog beamforming;
transmitting the analog beamformed millimeter wave band signals;
transmitting the sub-7 GHz band signals, wherein the sub-7 GHz band signals are transmitted with digital beamforming and without analog beamforming, and wherein the millimeter wave band signals are transmitted with both digital and analog beamforming.

14. The method of claim 13, wherein a Medium Access Control (MAC) layer multiplexes the data into at least the first component carrier data and the second component carrier data.

15. The method of claim 13, further comprising varying the amplitude of the millimeter wave band signals for analog gain control.

16. The method of claim 13, further comprising channel coding and rate matching the first and second component carrier data by a Physical layer.

17. The method of claim 13, wherein the sub-7 GHz band signals and the millimeter wave band signals are transmitted by a user equipment (UE).

18. The method of claim 13, wherein the sub-7 GHz band signals and the millimeter wave band signals are transmitted by a radio base station.

19. The method of claim 13, further comprising multiplexing the transmit data into at least the first component carrier data and the second component carrier data based on Quality of Service (QoS) flow ID of bearer traffic.

20. The method of claim 13, further comprising multiplexing the transmit data into at least the first component carrier data and the second component carrier data based on the priority of Quality of Service (QoS) parameters associated with the transmit data.

21. An apparatus configured for wireless communication, comprising:
means for multiplexing transmit data into at least a first component carrier data and a second component carrier data;
means for digitally pre-coding at least the first and second component carrier data for digital beamforming;
means for converting the digitally pre-coded first and second component carrier data to first and second analog signals;
means for transmitting analog beamformed millimeter wave band signals, wherein the analog beamformed millimeter wave band signals are generated by processing the second analog signals; and
means for transmitting sub-7 GHz band signals, wherein the sub-7 GHz band signals are generated by processing the first analog signals, wherein the sub-7 GHz band signals are transmitted with digital beamforming and without analog beamforming, and wherein the millimeter wave band signals are transmitted with both digital and analog beamforming.

22. The apparatus of claim 21, further comprising means for processing the second analog signals, wherein the means for processing comprises:
means for up-converting the second analog signals to millimeter wave band signals; and
means for applying analog phase shift to the millimeter wave band signals for analog beamforming.

23. The apparatus of claim 21, further comprising means for processing the first analog signals, wherein the means for processing comprises means for up-converting the first analog signals to sub-7 GHz band signals.

24. The apparatus of claim 21, wherein the apparatus is a user equipment (UE).

25. The apparatus of claim 21, wherein the apparatus is a radio base station.

26. A method for wireless communication, comprising:
multiplexing transmit data into at least a first component carrier data and a second component carrier data depending on Quality of Service (QoS) parameters associated with the transmit data, wherein the QoS parameters include at least one of Guaranteed Bit Rate (GBR), non-Guaranteed Bit Rate (non-GBR), Priority Handling, Packet Delay Budget and Packet Error Loss rate;
digitally pre-coding at least the first and second component carrier data for digital beamforming;
converting the digitally pre-coded first and second component carrier data to first and second analog signals;
up-converting the first analog signals to sub-7 GHz band signals and up-converting the second analog signals to millimeter wave band signals;
applying analog phase shift to the millimeter wave band signals for analog beamforming;
transmitting the analog beamformed millimeter wave band signals;
transmitting the sub-7 GHz band signals, wherein the sub-7 GHz band signals are transmitted with digital beamforming and without analog beamforming, and wherein the millimeter wave band signals are transmitted with both digital and analog beamforming.

27. The method of claim 26, wherein the sub-7 GHz band signals and the millimeter wave band signals are transmitted by a user equipment (UE).

28. The method of claim 26, wherein the sub-7 GHz band signals and the millimeter wave band signals are transmitted by a radio base station.

* * * * *